United States Patent [19]

Shamie

[11] Patent Number: 5,221,106
[45] Date of Patent: Jun. 22, 1993

[54] TANDEM SEAT UMBRELLA STROLLER

[76] Inventor: Louis Shamie, 630 Avenue V, Brooklyn, N.Y. 11223

[21] Appl. No.: 872,495

[22] Filed: Apr. 23, 1992

[51] Int. Cl.$^5$ .............................................. B62B 7/08
[52] U.S. Cl. ................... 280/644; 280/649; 280/650; 280/47.4; 297/243
[58] Field of Search ............ 280/642, 643, 644, 647, 280/649, 650, 658, 47.4, 47.41, 42; 297/234, 243

[56] References Cited

U.S. PATENT DOCUMENTS

| | | | |
|---|---|---|---|
| 252,431 | 1/1882 | Collignon | 280/643 |
| 3,248,125 | 4/1966 | Gill | 280/643 X |
| 4,232,897 | 11/1980 | Maclaren et al. | 280/650 X |
| 4,266,807 | 5/1981 | Griffin | 280/644 X |
| 4,294,457 | 10/1981 | Thiboutot | 280/20 |
| 4,386,790 | 6/1983 | Kassai | 280/642 X |
| 4,527,665 | 7/1985 | Shamie | 280/47.41 X |
| 4,529,219 | 7/1985 | Shamie | 280/642 |
| 4,632,421 | 12/1986 | Shamie | 280/642 |
| 4,648,651 | 3/1987 | Hawkes | 280/47.41 X |
| 4,725,071 | 2/1988 | Shamie | 280/643 |
| 4,736,960 | 4/1988 | Batty et al. | 280/649 X |
| 4,743,043 | 5/1988 | Shamie | 280/644 |
| 4,753,453 | 6/1988 | Schibach | 280/647 X |
| 4,765,645 | 8/1988 | Shamie | 280/644 |
| 4,986,564 | 1/1991 | Liu | 280/642 |

FOREIGN PATENT DOCUMENTS 2832925  1/1980  Fed. Rep. of Germany ...... 280/644

Primary Examiner—Brian Johnson
Attorney, Agent, or Firm—Burgess, Ryan & Wayne

[57] ABSTRACT

An umbrella stroller includes two side frames, each having a main side tube and a rear side tube pivotally connected to the main side tube at an intermediate portion thereof; a bottom scissor frame foldably connecting the side frames together; two upwardly inclined support rods pivotally connected at rear ends thereof to lower ends of the rear side tubes, and pivotally secured to a lower end of a respective main side tube; a rear seat supporting assembly supporting a fabric seat between the pair of side frames and above the bottom scissor frame, the rear seat supporting assembly including two horizontal seat support bars, each hinged at a rear end thereof to an intermediate point of a rear side tube, and extending forwardly therefrom with a substantially horizontal orientation in the open configuration, a connecting bar pivotally connected between each horizontal seat support bar and the respective upwardly inclined support rod, and a back support; and a front seat supporting assembly for supporting a fabric seat between the pair of side frames, the front seat supporting assembly being provided in tandem with the rear seat supporting assembly; and the rear seat supporting assembly further including a hard seat rest connected between the horizontal seat support bars for providing a hard seat support for the rear seat supporting assembly.

22 Claims, 2 Drawing Sheets 5,221,106

TANDEM SEAT UMBRELLA STROLLER

BACKGROUND OF THE INVENTION

The present invention relates generally to strollers, and more particularly, is directed to an umbrella stroller that can safely hold two infants.

An umbrella stroller is a stroller that folds in half in the lengthwise direction and which has a lower articulated safety spreader bar mechanism connected between the frame halves for holding the frame halves apart and for permitting folding of the frame halves. The umbrella stroller is folded by pivoting the two parts of the lower articulated safety spreader bar mechanism upwardly so that the scissor frames collapse to permit the side frame halves to move together. A locking mechanism is generally associated with the lower articulated safety spreader bar mechanism in order to prevent accidental release of the lower articulated safety spreader bar mechanism. An umbrella stroller of this type is described in U.S. Pat. No. 4,765,645 to the same inventor herein, and the entire disclosure of which is incorporated herein by reference.

Other types of related strollers are described in U.S. Pat. Nos. 4,527,665; 4,529,219; 4,632,421; 4,725,071; and 4,743,043, all to the same inventor herein, and the entire disclosures of which are incorporated herein by reference.

Strollers for transporting two infants have been made in two different configurations, namely a side-by-side configuration and a tandem (one in back of the other) configuration. Although side-by-side umbrella strollers are known, umbrella strollers of the tandem type have not been known. As a result, tandem strollers for transporting two infants have conventionally been of the non-umbrella stroller type. This, however, requires a heavy, more complicated assembly than an umbrella stroller, and is therefore, not as easily foldable and transportable.

Further, with all umbrella strollers, the fabric is generally slung between two side supports only. This feature makes the umbrella stroller less complicated than a non-umbrella stroller, but it also diminishes the support for the infant, making the stroller less comfortable, particularly during long periods of time.

OBJECTS AND SUMMARY OF THE INVENTION

Accordingly, it is an object of the present invention to provide a tandem stroller that overcomes the problems with the aforementioned prior art.

It is another object of the present invention to provide a tandem stroller of the umbrella stroller type.

It is still another object of the present invention to provide a tandem umbrella stroller in which there is a rigid support for the back seat.

In accordance with an aspect of the present invention, an umbrella stroller includes a pair of side frames; bottom scissor frame means for foldably connecting the side frames together; rear seats supporting means for supporting a fabric seat between the pair of side frames and above the bottom scissor frame means; and front seat supporting means for supporting a fabric seat between the pair of side frames and above the bottom scissor frame means, the front seat supporting means being provided in tandem with the rear seat supporting means.

Each side frame includes a main side tube and a rear side tube pivotally connected to the main side tube at an intermediate portion thereof. Further, the bottom scissor frame means is connected to lower portions of the main side tubes and the rear side tubes, and the lower articulated safety spreader bar means is connected between the rear side tubes.

In addition, two upwardly inclined support rods are pivotally connected at rear ends thereof to lower ends of the rear side tubes, at positions above the bottom scissor frame means, and are pivotally secured to a lower end of a respective main side tube.

The rear seat supporting means includes two horizontal seat support bars, each pivotally hinged at a rear end thereof to an intermediate point of a respective rear side tube, and extending forwardly therefrom with a substantially horizontal orientation in an open configuration of the umbrella stroller; a connecting bar pivotally connected between each horizontal seat support bar and the respective upwardly inclined support rod; and a back support. The back support includes two back support rods, each pivotally connected at a lower end thereof to a respective rear side tube, and a back scissor frame which interconnects the back support rods, wherein a fabric can be stretched between the rear side tubes, the horizontal seat support bars and the back support rods to form a rear seat.

The back support further includes means for setting the back support at a desired angle with respect to the rear tubes in an open configuration of the umbrella stroller.

In accordance with another aspect of the invention, the umbrella stroller includes a hard seat rest for providing a hard seat support for the rear seat support, the hard seat rest being connected between the horizontal seat support bars. The hard seat rest includes a first pair of spreader pivoting bars, each having one end pivotally connected to a respective horizontal seat support bar near a front end thereof, with opposite centrally located ends of the pivoting bars being pivotally connected to each other; a second pair of spreader pivoting bars, each having one end pivotally connected to a rear portion of a respective horizontal seat support bar, with opposite centrally located ends of the pivoting bars of the second pair being pivotally connected to each other; and a horizontally oriented connecting bar connected between the pivot connections of the pivoting bars of the first and second pairs. The hard seat rest further includes two struts connected between the horizontal seat support bars and the upwardly inclined support rods for further supporting the hard seat rest.

The front seat supporting means includes two back support rods, each pivotally connected with a respective upwardly inclined support rod; two horizontal seat support bars, each pivotally hinged at a rear end thereof to an intermediate position of a respective back support rod, and pivotally hinged to a forward position on a respective upwardly inclined support rod in an open configuration of the umbrella stroller; and a back scissor frame which interconnects the back support rods, wherein a fabric can be stretched between the back support rods and the upwardly inclined support rods to form a rear seat.

Further, there is provided a tandem connection for releasably connecting the front seat supporting means to the rear seat supporting means. The tandem connection includes a pin on the rear seat supporting means, and a hook on the front seat supporting means for hooking onto the pin.

The above and other objects, features and advantages of the invention will become readily apparent from the following detailed description thereof which is to be read in connection with the accompanying drawings.

DETAILED DESCRIPTION OF THE PREFERRED EMBODIMENTS

Figure 1:
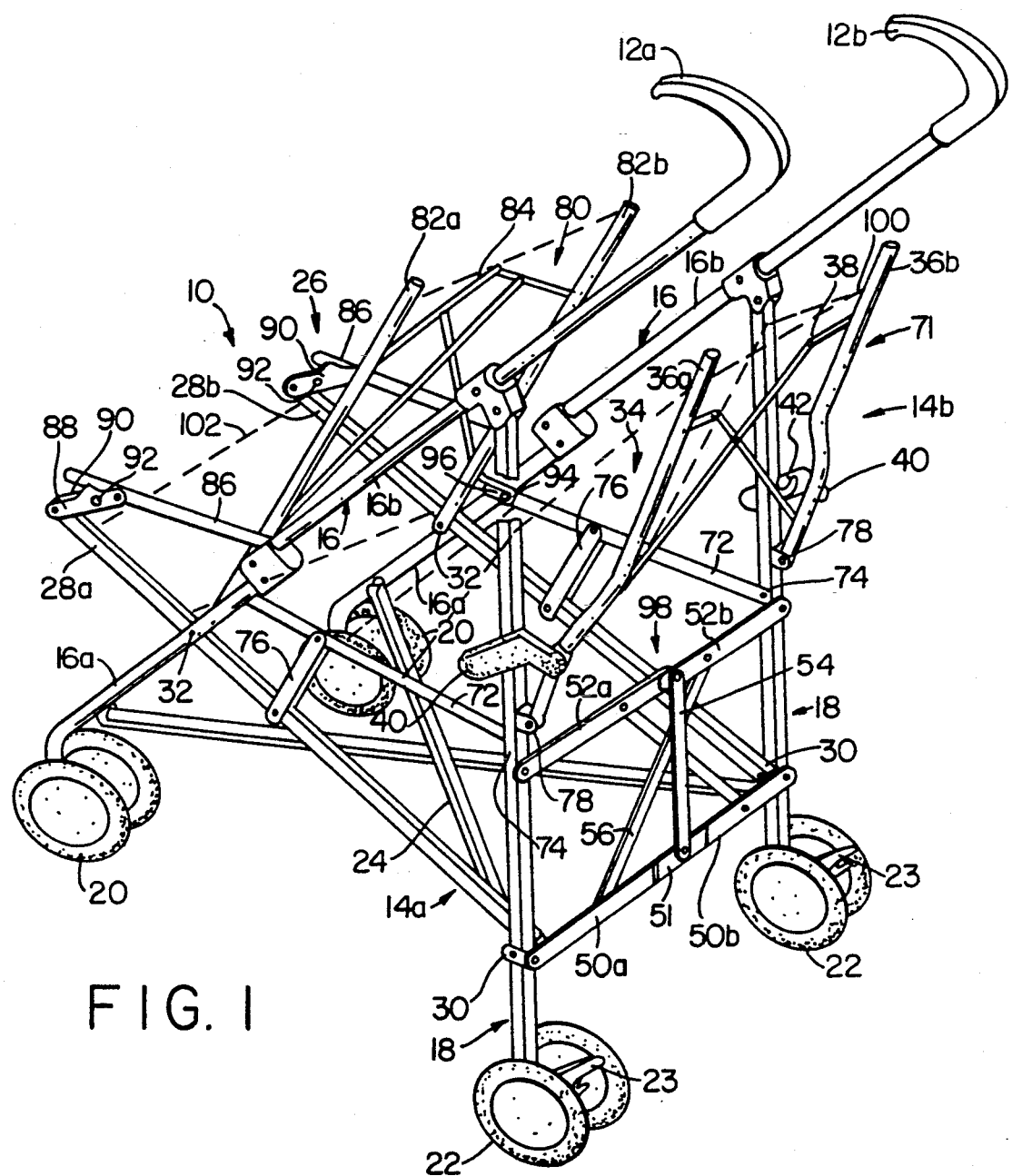
FIG. 1 is a perspective view of the frame of a tandem umbrella stroller according to one embodiment of the present invention, in its fully opened configuration.

Referring to the drawings in detail, and initially to FIG. 1, a tandem umbrella stroller 10 according to the present invention will first be described. An umbrella type of stroller derives its name from the hook shaped handles 12a and 12b that resemble umbrella handles.

Tandem umbrella stroller 10 includes a pair of spaced apart side frame halves 14a and 14b, each having a main side tube 16 and a rear side tube 18 pivotally connected to main side tube 16 at an intermediate portion thereof. Each main side tube 16 includes a lower tube portion 16a that is pivotally mounted at its upper end to an upper tube portion 16b. Hook shaped handles 12a and 12b are fixed to the upper free ends of upper tube portions 16b, and the upper ends of rear side tubes 18 are pivotally connected to an approximate mid-point of upper tube portions 16b.

The free lower ends of lower tube portions 16a carry the front wheels 20 of stroller 10, while the free lower ends of rear side tubes 18 carry the rear wheels 22 of stroller 10. Rear wheels 22 are also provided with foot actuated releasable brakes 23.

A lower scissor frame 24 interconnects the lower ends of lower tube portions 16a of main side tubes 16 and the lower ends of rear side tubes 18, at positions above Wheels 20 and 22.

A collapsible fabric support structure 26 is also provided. Specifically, collapsible fabric support structure 26 includes two upwardly inclined support rods 28a and 28b that are pivotally connected by pivot pins 30 at their rear ends to lower ends of rear side tubes 18, at positions immediately above lower scissor frame 24 in the open configuration of FIG. 1. In addition, each support rod 28a and 28b is pivotally secured, at a position approximately 25% of the length of each support rod 28a and 28b from its forward end, to the respective lower tube portion 16a at a position thereof approximately two-thirds of the distance from the lower end thereof, by pivot pins 32. As a result, support rods 28a and 28b are pivotally connected to the lower ends of rear side tubes 18 and to the respective lower tube portions 16a.

Collapsible fabric support structure 26 further includes a tandem seat support structure 34 for supporting two fabric seats in tandem. Specifically, tandem seat support structure 34 includes a rear seat supporting assembly 71 including two horizontal seat support bars 72, each pivotally hinged at its rear end by a pivot pin 74 to an approximate mid-point of a rear side tube 18, and extending forwardly therefrom with a horizontal orientation in the open configuration of stroller 10. A connecting bar 76 is pivotally connected between each horizontal seat support bar 72 and the respective upwardly inclined support rod 28a or 28b. Specifically, each connecting bar 76 is pivotally connected at its upper end to a horizontal seat support bar 72 at a position approximately 25% of its length from the front end thereof, and is pivotally connected at its lower end to the respective upwardly inclined support rod 28a or 28b at an approximate mid-point thereof. As shown, it is preferable that there are two connecting bars 76 associated with each side of stroller 10.

Rear seat supporting assembly 71 further includes two back support rods 36a and 36b pivotally connected at their lower ends to rear side tubes 18, substantially at mid-points thereof, that is, adjacent to pivot pins 74, by means of pivot bracket assemblies 78. In the open configuration of stroller 10, as shown in FIG. 1, back support rods 36a and 36b extend in a substantially upright position. A back scissor frame 38 interconnects back support rods 36a and 36b.

Further, L-shaped housings 40 are pivotally connected at one end thereof to lower portions of back support rods 36a and 36b. As shown in FIGS. 1 and 2, each L-shaped housing 40 includes an elongated groove 42 having stop areas 42a, 42b and 42c. A pin 44 connected to each rear side tube 18 is slidably fit within a respective groove 42 and can be engaged with any of stop areas 42a, 42b or 42c to set rear seat supporting assembly 71 at a desired angle of comfort for an infant. Of course, it will be appreciated that seat supporting assembly 71 is thereby restrained between the position defined by stop area 42a and the position defined by stop area 42c.

A fabric 100 shown in phantom is stretched between rear side tubes 18, between horizontal seat support bars 72 and also between back support rods 36a and 36b. Thus, the fabric is stretched to provide a seating area for an infant. In such case, it will be appreciated that scissor frame 38 provides In addition, tandem seat support structure 34 includes a front seat supporting assembly 80 including two back support rods 82a and 82b pivotally connected at their lower ends to upwardly inclined support rods 28a and 28b, respectively, by pivot pins 32. In the open configuration of stroller 10, as shown in FIG. 1, back support rods 82a and 82b extend in a substantially upright position. A back scissor frame 84 interconnects back support rods 82a and 82b.

In addition, front seat supporting assembly 80 includes horizontal seat support bars 86, each having a rear end pivotally hinged by a pivot pin not shown to a back support rod 82a or 82b at a point approximately one-third of the distance of the respective back support rod 82a or 82b from its lower end. Each horizontal seat support bar 86 extends forwardly therefrom with a horizontal orientation in the open configuration of stroller 10. Each horizontal seat support bar 86 further serves as an arm rest for the infant.

A first connecting plate 88 has one end pivotally connected to the forward end of a respective upwardly inclined support rod 28a or 28b and an opposite end pivotally connected to a horizontal seat support bar 86 at a position approximately one-quarter of the way from the forward end thereof. It will be appreciated that first connecting plate 88 is positioned to the outside of the respective upwardly inclined support rod 28a or 28b and to the outside of the respective horizontal seat support bar 86. Thus, a second connecting plate 90 is pivotally connected to the same upwardly inclined support rod 28a or 28b and to the same respective horizontal seat support bar 86, but to the inside thereof, in parallel spaced relation to first connecting plate 88. A pin 92 is connected between connecting plates 88 and 90.

Thus, connecting plates 88 and 90 limit the rearward pivotal motion of back support rods 82a and 82b. The position of pin 92 will further limit the extent of such rearward travel so as to maintain the same in an upright position for support.

Figure 2:
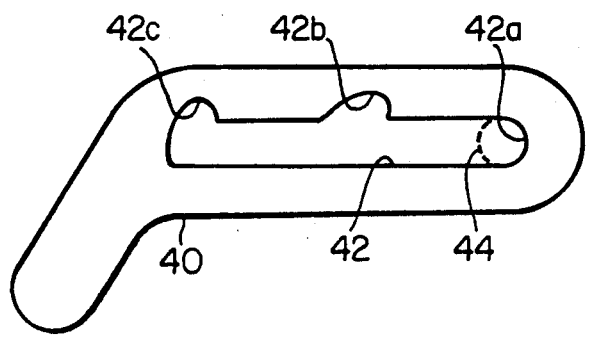
FIG. 2 is an inside plan view of one L-shaped housing.

In addition, as shown in the broken-away portion of FIG. 1, each back support rod 82a and 82b has a hook 94 attached thereto which is adapted to engage with a pin 96 extending inwardly at the forward end of each respective horizontal seat support bar 72, when stroller 10 is in its opened configuration. In this manner, front seat supporting assembly 80 is connected with rear seat supporting assembly 71 and will not pitch forward when a child is in the front seat.

A fabric 102 shown in Phantom is stretched between back support rods 82a and 82b and also between upwardly inclined support rods 28a and 28b. In addition, the fabric hangs down from the arm rests defined by horizontal seat support bars 86. Thus, the fabric is stretched to provide a seating area for an infant. In such case, it will be appreciated that scissor frame 84 provides a back rest for the fabric, and thereby, for the infant.

In addition, as shown in FIGS. 1, a lower articulated safety spreader bar mechanism 48 is connected between the lower ends of rear side tubes 18 in order to hold side frame halves 14a and 14b apart in the open configuration of stroller 10 shown in FIG. 1. Lower articulated safety spreader bar mechanism 48 includes one pair of lower spreader pivoting bars 50a and 50b, each having one end pivotally connected to a lower portion of a respective rear side tube 18. The opposite centrally located ends of pivoting bars 50a and 50b are pivotally connected to each other or adjacent each other to a central channel member 51.

Further, lower articulated safety spreader bar mechanism 48 includes another pair of lower spreader pivoting bars 52a and 52b, each having one end pivotally connected to a mid-portion of a respective rear side tube 18. The opposite centrally located ends of pivoting bars 52a and 52b are pivotally connected to each other. Pivoting bars 52a and 52b are positioned above pivoting bars 50a and 50b. A vertically oriented connecting bar 54 is connected between the pivot connection of pivoting bars 50a and 50b and the pivot connection of pivoting bars 52a and 52b. As a result, when pivoting bars 50a and 50b are pivoted with respect to each other, pivoting bars 52a and 52b are also pivoted with respect to each other. Further, a scissor frame 56 is connected between pivoting bars 50a, 50b, 52a and 52b.

Figure 3:
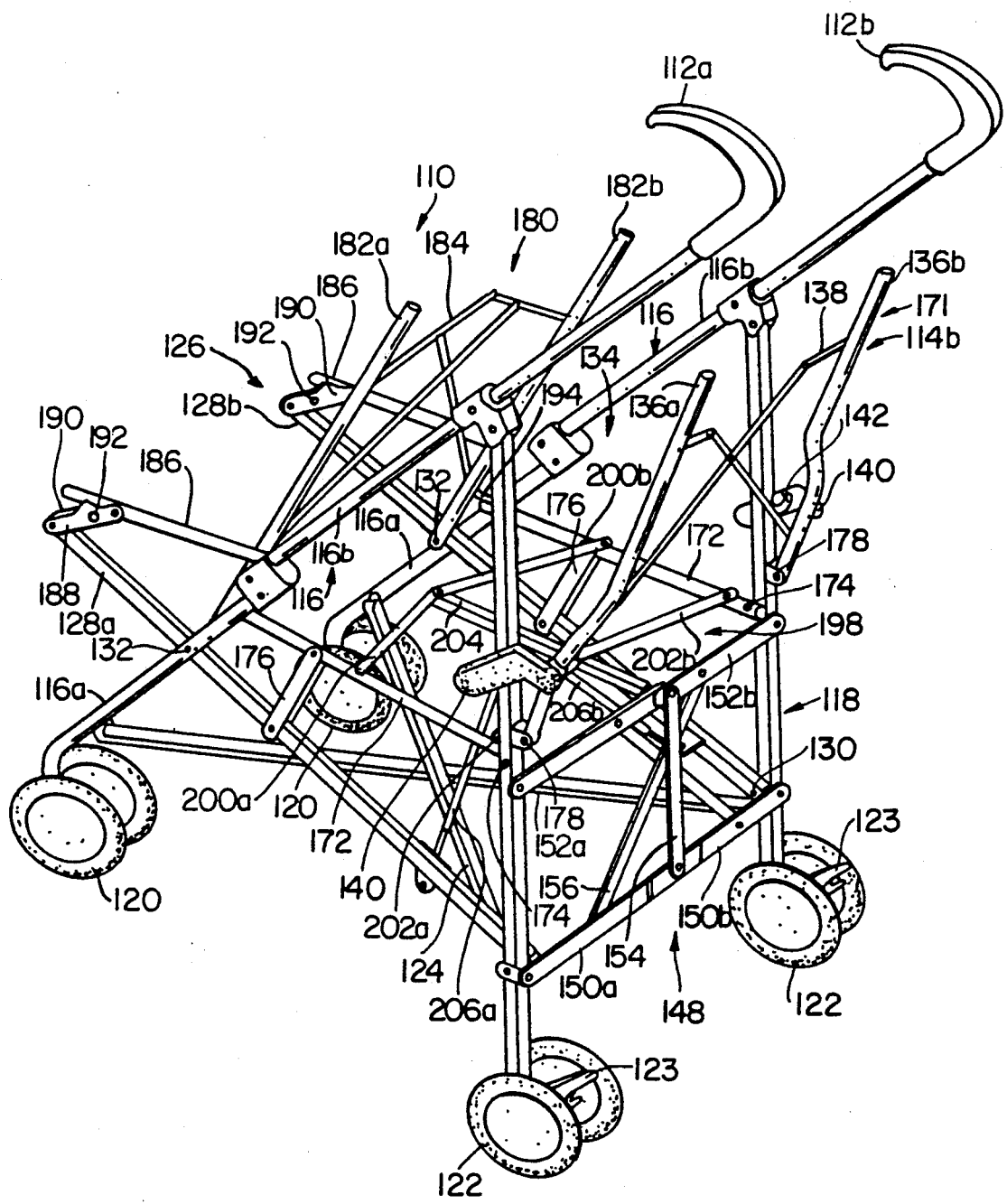
FIG. 3 is a perspective view of the frame of a tandem umbrella stroller according to another embodiment of the present invention, in its fully opened configuration.

Referring now to FIG. 3, a tandem umbrella stroller 110 according to another embodiment of the present invention will now be described in which elements corresponding to those described above with respect to umbrella stroller 10 are identified by the same reference numerals, augmented by 100, and a detailed description of the common elements will not be described.

Specifically, in conventional umbrella strollers, the fabric is stretched between opposite side rails, as described above. As a result, when a child is seated within the stroller, the seat tends to sag, and over a long period of time, may be uncomfortable. Therefore, in accordance with the second embodiment of stroller 110, a hard seat rest 198 is provided for rear seat supporting assembly 171. Specifically, hard seat rest 198 includes a first pair of forward spreader pivoting bars 200a and 200b, each having one end pivotally connected to a respective horizontal seat support bar 172, at a position approximately three-eighths of the way from the front end thereof. The opposite centrally located ends of pivoting bars 200a and 200b are pivotally connected to each other, so as to form an obtuse angle of approximately 160° therebetween in the open configuration of stroller 110.

Further, hard seat rest 198 includes another pair of spreader pivoting bars 202a and 202b, each having one end pivotally connected to a rear portion of a respective horizontal seat support bar 172. The opposite centrally located ends of pivoting bars 202a and 202b are pivotally connected to each other, so as to also form an obtuse angle of approximately 160° therebetween in the open configuration of stroller 110. A horizontally oriented connecting bar 204 is connected between the pivot connection of pivoting bars 200a and 200b and the pivot connection of pivoting bars 202a and 202b. As a result, when pivoting bars 200a and 200b are pivoted with respect to each other, pivoting bars 202a and 202b are also pivoted with respect to each other. Thus, the seat portion of the fabric for the rear seat rests upon pivoting bars 200a, 200b, 202a and 202b, as well as on horizontally oriented connecting bar 204, to provide a first seat support in an umbrella stroller.

To further enhance the structural integrity of hard seat rest 198, a first strut 206a is connected between horizontally oriented connecting bar 204 at a point thereon approximately one-third of the way from the front end thereof, and a respective upwardly inclined support rod 128a or 128b near the rear end thereof. First strut 206a is connected for pivotal movement in two ways, namely a first pivotal movement that permits stroller side frame halves 114a and 114b to move toward and away from each other and a front to back pivotal movement. A second strut 206b is connected between horizontally oriented connecting bar 204 and the other upwardly inclined support rod 128b or 128a on the opposite side of stroller 110, in an identical manner to strut 206a.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What is claimed is:
1. An umbrella stroller comprising:
 a pair of side frames, each said side frame including:
  a main side tube,
  a rear side tube pivotally connected to the main side tube at an intermediate portion of said main side tube, and
  an upwardly inclined support rod pivotally connected at a rear end thereof to a lower end of said rear side tube, and pivotally secured to a lower end of the main side tube;
 bottom scissor frame means for foldably connecting said side frames together;
 rear seat supporting means for supporting a fabric seat between said pair of side frames and above said bottom scissor frame means, said rear seat supporting means including:
two horizontal seat support bars positioned above said upwardly inclined support rods, each horizontal seat support bar having a rear end pivotally hinged to an intermediate point of a respective said rear side tube, extending forwardly therefrom with a substantially horizontal orientation in an open configuration of said umbrella stroller and having a front end pivotally connected to an intermediate portion of said main side tube, and
means for providing a back support; and
front seat supporting means for supporting a fabric seat between said pair of side frames and above said bottom scissor frame means, said front seat supporting means being provided in tandem with said rear seat supporting means, said front seat supporting means including:
two back support rods, each pivotally connected with a respective said upwardly inclined support rod, and
folding connecting means for interconnecting said back support rods, wherein a fabric can be stretched between said back support rods and said upwardly inclined support rods to form a front seat;
wherein collapsing of said stroller causes said rear seat supporting means and said front seat supporting means to collapse with said stroller.

2. An umbrella stroller according to claim 1, wherein said bottom scissor frame means is connected to lower portions of said main side tubes and said rear side tubes.

3. An umbrella stroller according to claim 1, wherein said rear seat supporting means further includes a connecting bar pivotally connected between each said horizontal seat support bar and the respective upwardly inclined support rod.

4. An umbrella stroller according to claim 3, wherein said means for providing a back support includes:
two back support rods, each pivotally connected at a lower end thereof to a respective said rear side tube; and
a back scissor frame which interconnects said back support rods, wherein a fabric can be stretched between said rear side tubes, said horizontal seat support bars and said back support rods to form a rear seat.

5. An umbrella stroller according to claim 4, wherein the lower end of each said back support rod is connected to a respective said rear tube at an intermediate point of said respective rear tube.

6. An umbrella stroller according to claim 4, wherein said means for providing a back support further includes means for setting said back support rods at a desired angle with respect to said rear tubes in an open configuration of said umbrella stroller.

7. An umbrella stroller according to claim 6, wherein said means for setting includes a housing pivotally connected at one end thereof to a lower portion of each said back support rod, each said housing having an elongated groove with stop areas, and a pin connected to each said rear side tube and which is slidably fitted within a respective groove and which can be engaged with any of said stop areas to set said back support rods at a desired angle with respect to said rear tubes in the open configuration of said umbrella stroller.

8. An umbrella stroller according to claim 3, further including hard seat rest means for providing a hard seat support for said rear seat supporting means, said hard seat rest means being connected between said horizontal seat support bars.

9. An umbrella stroller according to claim 8, wherein said hard seat rest means includes:
a first pair of spreader pivoting bars, each having one end pivotally connected to a respective horizontal seat support bar near a front end thereof, with opposite centrally located ends of said pivoting bars of said first pair being pivotally connected to each other;
a second pair of spreader pivoting bars, each having one end pivotally connected to a rear portion of a respective horizontal seat support bar, with opposite centrally located ends of said pivoting bars of said second pair being pivotally connected to each other; and
a horizontally oriented connecting bar connected between the pivot connections of said pivoting bars of said first and second pairs.

10. An umbrella stroller according to claim 9, wherein said hard seat rest means further includes strut means connected between said horizontally oriented connecting bar and said upwardly inclined support rods for further supporting said hard seat rest means.

11. An umbrella stroller according to claim 3, wherein said front seat supporting means further includes two horizontal seat support bars, each pivotally hinged at a rear end thereof to an intermediate position of a respective said back support rod, and pivotally hinged to a forward position on a respective said upwardly inclined support rod in an open configuration of said umbrella stroller; and said folding connecting means includes a back scissor frame which interconnects said back support rods, wherein a fabric can be stretched between said back support rods and said upwardly inclined support rods to form a front seat.

12. An umbrella stroller according to claim 11, further including tandem connection means for releasably connecting the front seat supporting means to the rear seat supporting means.

13. An umbrella stroller according to claim 12, wherein said tandem connection means includes a pin on one of said front seat supporting means and said rear seat supporting means, and hook means on the other of said front seat supporting means and said rear seat supporting means for hooking onto said pin.

14. An umbrella stroller comprising:
a pair of side frames, each said side frame including:
a main side tube,
a rear side tube pivotally connected to the main side tube at an intermediate portion thereof, and
two upwardly inclined support rods pivotally connected at rear ends thereof to lower ends of said rear side tubes, at positions above said bottom scissor frame means, and pivotally secured to a lower end of a respective said main side tube;
bottom scissor frame means for foldably connecting said side frames together;
rear seat supporting means for supporting a fabric seat between said pair of side frames and above said bottom scissor frame means, said rear seat supporting means including:
two horizontal seat support bars, each pivotally hinged at a rear end thereof to an intermediate point of a respective said rear side tube, and extending forwardly therefrom with a substantially horizontal orientation in an open configuration of said umbrella stroller, and a connecting bar pivotally connected between each said horizontal seat support bar and the respective upwardly inclined support rod, and means for providing a back support, including:

two back support rods, each pivotally connected at a lower end thereof to a respective said rear side tube, and a back scissor frame which interconnects said back support rods, wherein a fabric can be stretched between said rear side tubes, said horizontal seat support bars and said back support rods to form a rear seat; and front seat supporting means for supporting a fabric seat between said pair of side frames and above said bottom scissor frame means, said front seat supporting means being provided in tandem with said rear seat supporting means.

15. An umbrella stroller according to claim 14, wherein the lower end of each said back support rod is connected to a respective said rear tube at an intermediate point of said respective rear tube.

16. An umbrella stroller according to claim 14, wherein said means for providing a back support further includes means for setting said back support rods at a desired angle with respect to said rear tubes in an open configuration of said umbrella stroller.

17. An umbrella stroller according to claim 16, wherein said means for setting includes a housing pivotally connected at one end thereof to a lower portion of each said back support rod, each said housing having an elongated groove with stop areas, and a pin connected to each said rear side tube and which is slidably fitted within a respective groove and which can be engaged with any of said stop areas to set said back support rods at a desired angle with respect to said rear tubes in the open configuration of said umbrella stroller.

18. An umbrella stroller comprising:

a pair of side frames, each said side frame including:
a main side tube,
a rear side tube pivotally connected to the main side tube at an intermediate portion thereof, and
two upwardly inclined support rods pivotally connected at rear ends thereof to lower ends of said rear side tubes, at positions above said bottom scissor frame means, and pivotally secured to a lower end of a respective said main side tube;

bottom scissor frame means for foldably connecting said side frames together;

rear seat supporting means for supporting a fabric seat between said pair of side frames and above said bottom scissor frame means, said rear seat supporting means including:

two horizontal seat support bars, each pivotally hinged at a rear end thereof to an intermediate point of a respective said rear side tube, and extending forwardly therefrom with a substantially horizontal orientation in an open configuration of said umbrella stroller, a connecting bar pivotally connected between each said horizontal seat support bar and the respective upwardly inclined support rod, means for providing a back support, and hard seat rest means for providing a hard seat support, said hard seat rest means being connected between said horizontal seat support bars and including:

a first pair of spreader pivoting bars, each having one end pivotally connected to a respective horizontal seat support bar near a front end thereof, with opposite centrally located ends of said pivoting bars of said first pair being pivotally connected to each other, a second pair of spreader pivoting bars, each having one end pivotally connected to a rear portion of a respective horizontal seat support bar, with opposite centrally located ends of said pivoting bars of said second pair being pivotally connected to each other, and a horizontally oriented connecting bar connected between the pivot connections of said pivoting bars of said first and second pairs; and front seat supporting means for supporting a fabric seat between said pair of side frames and above said bottom scissor frame means, said front seat supporting means being provided in tandem with said rear seat supporting means.

19. An umbrella stroller according to claim 18, wherein said hard seat rest means further includes strut means connected between said horizontally oriented connecting bar and said upwardly inclined support rods for further supporting said hard seat rest means.

20. An umbrella stroller comprising:

a pair of side frames, each said side frame including:
a main side tube,
a rear side tube pivotally connected to the main side tube at an intermediate portion thereof, and
two upwardly inclined support rods pivotally connected at rear ends thereof to lower ends of said rear side tubes, at positions above said bottom scissor frame means, and pivotally secured to a lower end of a respective said main side tube;

bottom scissor frame means for foldably connecting said side frames together;

rear seat supporting means for supporting a fabric seat between said pair of side frames and above said bottom scissor frame means, said rear seat supporting means including:

two horizontal seat support bars, each pivotally hinged at a rear end thereof to an intermediate point of a respective said rear side tube, and extending forwardly therefrom with a substantially horizontal orientation in an open configuration of said umbrella stroller, a connecting bar pivotally connected between each said horizontal seat support bar and the respective upwardly inclined support rod, and means for providing a back support; and front seat supporting means for supporting a fabric seat between said pair of side frames and above said bottom scissor frame means, said front seat supporting means being provided in tandem with said rear supporting means, said front seat supporting means including:

two back support rods, each pivotally connected with a respective said upwardly inclined support rod, two horizontal seat support bars, each pivotally hinged at a rear end thereof to an intermediate position of a respective said back support rod, and pivotally hinged to a forward position on a respective said upwardly inclined support rod in an open configuration of said umbrella stroller, and a back scissor frame which interconnects said back support rods, wherein a fabric can be stretched between said back support rods and said upwardly inclined support rods to form a rear seat.

21. An umbrella stroller according to claim 20, further including tandem connection means for releasably connecting the front seat supporting means to the rear seat supporting means.

22. An umbrella stroller according to claim 21, wherein said tandem connection means includes a pin on one of said front seat supporting means and said rear seat supporting means, and hook means on the other of said front seat supporting means and said rear seat supporting means for hooking onto said pin.

* * * * *